(12) United States Patent
Walker et al.

(10) Patent No.: US 8,721,437 B2
(45) Date of Patent: *May 13, 2014

(54) GAME BASED ON SPEED OF PLAY

(71) Applicant: IGT, Las Vegas, NV (US)

(72) Inventors: Jay S. Walker, Ridgefield, CT (US); James A. Jorasch, New York, NY (US); Daniel E. Tedesco, Shelton, CT (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,364

(22) Filed: Nov. 20, 2013

(65) Prior Publication Data

US 2014/0080586 A1  Mar. 20, 2014

Related U.S. Application Data

(63) Continuation of application No. 13/889,891, filed on May 8, 2013, which is a continuation of application No. 13/212,618, filed on Aug. 18, 2011, now Pat. No. 8,439,739, which is a continuation of application No. 10/790,167, filed on Mar. 1, 2004, now Pat. No. 8,021,222, which is a continuation-in-part of application No. 09/783,251, filed on Feb. 14, 2001, now Pat. No. 6,695,700, and a continuation-in-part of application No. 09/001,902, filed on Dec. 31, 1997, now Pat. No. 6,238,288.

(60) Provisional application No. 60/451,573, filed on Mar. 3, 2003.

(51) Int. Cl.
*G07F 17/32* (2006.01)
*G07F 17/34* (2006.01)

(52) U.S. Cl.
USPC ................................. 463/25; 463/20; 463/26

(58) Field of Classification Search
CPC ....... G07F 17/32; G07F 17/34; G07F 17/326; G07F 17/3244
USPC ................................................. 463/25, 26, 20
See application file for complete search history.

(56) References Cited

U.S. PATENT DOCUMENTS 4,072,930 A  2/1978  Lucero et al.
4,238,127 A  12/1980  Lucero et al.
(Continued)

FOREIGN PATENT DOCUMENTS

AU  524709  9/1982
AU  589158  10/1989
(Continued)

OTHER PUBLICATIONS

Kent, Bill, "Atlantic City, The Slot With Something Extra," The New York Times, Oct. 29, 1995, Section: 13NJ, p. 16, col. 3, New Jersey Weekly Desk.

(Continued)

*Primary Examiner* — Pierre E Elisca
(74) *Attorney, Agent, or Firm* — Neal, Gerber & Eisenberg LLP

(57) ABSTRACT

In accordance with the present invention, a gaming device such as a slot machine calculates a speed of game play, and in turn determines a pay schedule based on the speed of game play. In some embodiments, a count is adjusted throughout a multiple play session based on point values associated with symbols on the reels of a slot machine, and payouts are awarded in accordance with (i) a finishing count, and/or (ii) a "virtual average speed".

12 Claims, 14 Drawing Sheets

(56) References Cited

U.S. PATENT DOCUMENTS

| | | |
|---|---|---|
| 4,299,388 A | 11/1981 | Resch et al. |
| 4,353,554 A | 10/1982 | Fisher |
| 4,373,727 A | 2/1983 | Hooker et al. |
| 4,430,903 A | 2/1984 | Hooker et al. |
| 4,479,081 A | 10/1984 | Harris |
| 4,575,085 A | 3/1986 | Ollington |
| 4,593,904 A | 6/1986 | Graves |
| 4,661,906 A | 4/1987 | DiFrancesco et al. |
| 4,669,731 A | 6/1987 | Clarke |
| 4,676,506 A | 6/1987 | Crouch |
| 4,679,143 A | 7/1987 | Hagiwara |
| 4,770,415 A | 9/1988 | Evans et al. |
| 4,805,907 A | 2/1989 | Hagiwara |
| 4,817,951 A | 4/1989 | Crouch et al. |
| 4,837,728 A | 6/1989 | Barrie et al. |
| 4,838,552 A | 6/1989 | Hagiwara |
| 4,842,278 A | 6/1989 | Markowicz |
| 4,844,464 A | 7/1989 | Berge |
| 4,856,787 A | 8/1989 | Itkis |
| 4,871,171 A | 10/1989 | Rivero |
| 4,964,638 A | 10/1990 | Ishida |
| 4,991,848 A | 2/1991 | Greenwood et al. |
| 5,024,439 A | 6/1991 | Okada |
| 5,033,744 A | 7/1991 | Bridgeman et al. |
| 5,048,833 A | 9/1991 | Lamle |
| 5,072,381 A | 12/1991 | Richardson et al. |
| 5,092,598 A | 3/1992 | Kamille |
| 5,116,055 A | 5/1992 | Tracy |
| 5,123,649 A | 6/1992 | Tiberio |
| 5,127,651 A | 7/1992 | Okada |
| 5,154,420 A | 10/1992 | Gutknecht |
| 5,178,395 A | 1/1993 | Lovell |
| 5,224,706 A | 7/1993 | Bridgeman |
| 5,249,800 A | 10/1993 | Hilgendorf et al. |
| 5,275,400 A | 1/1994 | Weingardt |
| 5,277,424 A | 1/1994 | Wilms |
| 5,280,909 A | 1/1994 | Tracy |
| 5,286,023 A | 2/1994 | Wood |
| 5,292,127 A | 3/1994 | Kelly et al. |
| 5,297,802 A | 3/1994 | Pocock et al. |
| 5,342,049 A | 8/1994 | Wichinsky et al. |
| 5,344,144 A | 9/1994 | Canon |
| 5,370,399 A | 12/1994 | Liverance |
| 5,393,057 A | 2/1995 | Marnell, II |
| 5,393,061 A | 2/1995 | Manship et al. |
| 5,398,938 A | 3/1995 | Money |
| 5,417,430 A | 5/1995 | Breeding |
| 5,423,541 A | 6/1995 | Nicastro et al. |
| 5,456,465 A | 10/1995 | Durham |
| 5,470,079 A | 11/1995 | LeStrange et al. |
| 5,472,194 A | 12/1995 | Breeding et al. |
| 5,472,197 A | 12/1995 | Gwiasda et al. |
| 5,476,259 A | 12/1995 | Weingardt |
| 5,489,101 A | 2/1996 | Moody |
| 5,494,295 A | 2/1996 | Potter et al. |
| 5,511,781 A | 4/1996 | Wood |
| 5,516,293 A | 5/1996 | Heidel et al. |
| 5,518,253 A | 5/1996 | Pocock et al. |
| 5,531,441 A | 7/1996 | Dabrowski et al. |
| 5,536,016 A | 7/1996 | Thompson |
| 5,542,669 A | 8/1996 | Charron et al. |
| 5,544,893 A | 8/1996 | Jones et al. |
| 5,547,192 A | 8/1996 | Ishibashi |
| 5,560,603 A | 10/1996 | Seelig et al. |
| 5,564,700 A | 10/1996 | Celona |
| 5,569,084 A | 10/1996 | Nicastro et al. |
| 5,584,485 A | 12/1996 | Jone et al. |
| 5,584,763 A | 12/1996 | Kelly et al. |
| 5,603,502 A | 2/1997 | Nakagawa |
| 5,611,730 A | 3/1997 | Weiss |
| 5,613,912 A | 3/1997 | Slater |
| 5,626,341 A | 5/1997 | Jones |
| 5,645,486 A | 7/1997 | Nagao et al. |
| 5,655,961 A * | 8/1997 | Acres et al. ............ 463/27 |
| 5,664,998 A | 9/1997 | Seelig et al. |
| 5,683,295 A | 11/1997 | Frain |
| 5,697,483 A | 12/1997 | Ishida et al. |
| 5,697,614 A | 12/1997 | Potter et al. |
| 5,697,843 A | 12/1997 | Manship et al. |
| 5,702,304 A | 12/1997 | Acres et al. |
| 5,741,183 A | 4/1998 | Acres et al. |
| 5,743,523 A | 4/1998 | Kelly et al. |
| 5,743,800 A | 4/1998 | Huard et al. |
| 5,752,881 A | 5/1998 | Inoue |
| 5,752,882 A | 5/1998 | Acres et al. |
| 5,758,875 A | 6/1998 | Giacalone, Jr. |
| 5,761,647 A | 6/1998 | Boushy |
| 5,762,552 A | 6/1998 | Vuong |
| 5,766,076 A | 6/1998 | Pease et al. |
| 5,770,533 A | 6/1998 | Franchi |
| 5,779,544 A | 7/1998 | Seelig et al. |
| 5,779,545 A | 7/1998 | Berg et al. |
| 5,779,547 A | 7/1998 | SoRelle et al. |
| 5,779,549 A | 7/1998 | Walker et al. |
| 5,782,470 A | 7/1998 | Langan |
| 5,816,918 A | 10/1998 | Kelly et al. |
| 5,820,459 A | 10/1998 | Acres et al. |
| 5,833,536 A | 11/1998 | Davids et al. |
| 5,833,537 A | 11/1998 | Barrie |
| 5,836,817 A | 11/1998 | Acres et al. |
| 5,839,957 A | 11/1998 | Schneider et al. |
| 5,845,902 A | 12/1998 | Takemoto |
| 5,851,011 A | 12/1998 | Lott |
| 5,851,149 A | 12/1998 | Xidos et al. |
| 5,855,514 A | 1/1999 | Kamille |
| 5,855,515 A | 1/1999 | Pease et al. |
| 5,876,284 A | 3/1999 | Acres et al. |
| 5,885,158 A | 3/1999 | Torango et al. |
| 5,941,773 A | 8/1999 | Harlick |
| 5,944,606 A | 8/1999 | Gerow |
| 5,947,820 A | 9/1999 | Morro et al. |
| 5,951,011 A | 9/1999 | Potter et al. |
| 5,967,894 A | 10/1999 | Kinoshita et al. |
| 5,976,015 A | 11/1999 | Seelig et al. |
| 5,980,384 A | 11/1999 | Barrie |
| 5,984,779 A | 11/1999 | Bridgeman et al. |
| 5,988,499 A | 11/1999 | Sisca |
| 5,989,121 A | 11/1999 | Sakamoto |
| 5,993,316 A | 11/1999 | Coyle et al. |
| 5,997,400 A | 12/1999 | Seelig et al. |
| 6,001,016 A | 12/1999 | Walker et al. |
| 6,004,207 A | 12/1999 | Wilson, Jr. et al. |
| 6,007,427 A | 12/1999 | Wiener |
| 6,012,982 A | 1/2000 | Piechowiak et al. |
| 6,012,983 A | 1/2000 | Walker et al. |
| 6,015,344 A | 1/2000 | Kelly et al. |
| 6,019,369 A | 2/2000 | Nakagawa et al. |
| 6,033,306 A | 3/2000 | DeSouza |
| 6,033,307 A | 3/2000 | Vancura |
| 6,039,648 A | 3/2000 | Guinn et al. |
| 6,048,271 A | 4/2000 | Barcelou |
| 6,056,642 A | 5/2000 | Bennett |
| 6,062,980 A | 5/2000 | Luciano |
| 6,062,981 A | 5/2000 | Luciano, Jr. |
| 6,068,553 A | 5/2000 | Parker |
| 6,077,162 A | 6/2000 | Weiss |
| 6,077,163 A | 6/2000 | Walker et al. |
| 6,080,062 A | 6/2000 | Olson |
| 6,089,977 A | 7/2000 | Bennett |
| 6,089,980 A | 7/2000 | Gauselmann |
| 6,102,400 A | 8/2000 | Scott et al. |
| 6,110,041 A | 8/2000 | Walker et al. |
| 6,110,043 A | 8/2000 | Olsen |
| 6,120,376 A | 9/2000 | Cherry |
| 6,126,542 A | 10/2000 | Fier |
| 6,142,872 A | 11/2000 | Walker et al. |
| 6,142,875 A | 11/2000 | Kodachi et al. |
| 6,146,273 A | 11/2000 | Olsen |
| 6,152,823 A | 11/2000 | Lacoste et al. |
| 6,155,925 A | 12/2000 | Giobbi et al. |
| 6,159,095 A | 12/2000 | Frohm et al. |
| 6,159,096 A | 12/2000 | Yoseloff |
| 6,159,097 A | 12/2000 | Gura |
| 6,162,122 A | 12/2000 | Acres et al. |

(56) References Cited

U.S. PATENT DOCUMENTS

| | | |
|---|---|---|
| 6,168,520 B1 | 1/2001 | Baerlocher et al. |
| 6,174,233 B1 | 1/2001 | Sunaga et al. |
| 6,174,235 B1 | 1/2001 | Walker et al. |
| 6,174,237 B1 | 1/2001 | Stephenson |
| 6,183,366 B1 | 2/2001 | Goldberg et al. |
| 6,193,606 B1 | 2/2001 | Walker et al. |
| 6,203,010 B1 | 3/2001 | Jorasch et al. |
| 6,203,429 B1 | 3/2001 | Demar et al. |
| 6,203,430 B1 | 3/2001 | Walker et al. |
| 6,206,374 B1 | 3/2001 | Jones |
| 6,210,275 B1 | 4/2001 | Olsen |
| 6,210,277 B1 | 4/2001 | Stefan |
| 6,217,448 B1 | 4/2001 | Olsen |
| 6,220,961 B1 | 4/2001 | Keane et al. |
| 6,224,482 B1 | 5/2001 | Bennett |
| 6,224,484 B1 | 5/2001 | Okuda et al. |
| 6,224,486 B1 | 5/2001 | Walker et al. |
| 6,231,445 B1 | 5/2001 | Acres |
| 6,234,897 B1 | 5/2001 | Frohm et al. |
| 6,238,287 B1 | 5/2001 | Komori et al. |
| 6,238,288 B1 | 5/2001 | Walker et al. |
| 6,241,608 B1 | 6/2001 | Torango |
| 6,244,957 B1 | 6/2001 | Walker et al. |
| 6,244,958 B1 | 6/2001 | Acres |
| 6,254,483 B1 | 7/2001 | Acres |
| 6,257,981 B1 | 7/2001 | Acres et al. |
| 6,270,409 B1 | 8/2001 | Shuster |
| 6,287,201 B1 | 9/2001 | Hightower |
| 6,287,202 B1 | 9/2001 | Pascal et al. |
| 6,293,865 B1 | 9/2001 | Kelly et al. |
| 6,293,866 B1 | 9/2001 | Walker et al. |
| 6,299,165 B1 | 10/2001 | Nagano |
| 6,309,298 B1 | 10/2001 | Gerow |
| 6,309,299 B1 | 10/2001 | Weiss |
| 6,312,330 B1 | 11/2001 | Jones et al. |
| 6,315,660 B1 | 11/2001 | DeMar et al. |
| 6,315,662 B1 | 11/2001 | Jorasch et al. |
| 6,319,125 B1 | 11/2001 | Acres |
| 6,322,078 B1 | 11/2001 | Adams |
| 6,322,309 B1 | 11/2001 | Thomas et al. |
| 6,328,649 B1 | 12/2001 | Randall et al. |
| 6,336,857 B1 | 1/2002 | McBride |
| 6,343,989 B1 | 2/2002 | Wood et al. |
| 6,354,592 B1 | 3/2002 | Virzi |
| 6,358,149 B1 | 3/2002 | Schneider et al. |
| 6,361,441 B1 | 3/2002 | Walker et al. |
| 6,371,852 B1 | 4/2002 | Acres |
| 6,375,567 B1 | 4/2002 | Acres |
| 6,375,569 B1 | 4/2002 | Acres |
| 6,386,977 B1 | 5/2002 | Hole |
| 6,398,218 B1 | 6/2002 | Vancura |
| 6,406,369 B1 | 6/2002 | Baerlocher et al. |
| 6,416,408 B2 | 7/2002 | Tracy et al. |
| 6,416,409 B1 | 7/2002 | Jordan |
| 6,419,583 B1 | 7/2002 | Crumby et al. |
| 6,425,828 B2 | 7/2002 | Walker et al. |
| 6,431,983 B2 | 8/2002 | Acres |
| 6,435,511 B1 | 8/2002 | Vancura et al. |
| 6,435,968 B1 | 8/2002 | Torango |
| 6,439,995 B1 | 8/2002 | Hughs-Baird et al. |
| 6,443,837 B1 | 9/2002 | Jaffe et al. |
| 6,454,651 B1 | 9/2002 | Yoseloff |
| 6,464,582 B1 | 10/2002 | Baerlocher et al. |
| 6,471,591 B1 | 10/2002 | Crumby |
| 6,488,580 B1 | 12/2002 | Robb |
| 6,506,118 B1 | 1/2003 | Baerlocher et al. |
| 6,508,707 B2 | 1/2003 | DeMar et al. |
| 6,511,375 B1 | 1/2003 | Kaminkow |
| 6,511,376 B2 | 1/2003 | Walker et al. |
| 6,514,141 B1 | 2/2003 | Kaminkow et al. |
| 6,533,658 B1 | 3/2003 | Walker et al. |
| 6,533,664 B1 | 3/2003 | Crumby |
| 6,546,374 B1 | 4/2003 | Esposito et al. |
| 6,554,283 B2 | 4/2003 | Vancura et al. |
| 6,565,434 B1 | 5/2003 | Acres |
| 6,565,436 B1 | 5/2003 | Baerlocher |
| 6,569,015 B1 | 5/2003 | Baerlocher et al. |
| 6,575,830 B2 | 6/2003 | Baerlocher et al. |
| 6,575,832 B1 | 6/2003 | Manfredi et al. |
| 6,589,115 B2 | 7/2003 | Walker et al. |
| 6,592,460 B2 | 7/2003 | Torango |
| 6,595,854 B2 | 7/2003 | Hughs-Baird et al. |
| 6,599,185 B1 | 7/2003 | Kaminkow et al. |
| 6,599,193 B2 | 7/2003 | Baerlocher et al. |
| 6,607,437 B2 | 8/2003 | Casey et al. |
| 6,609,971 B2 | 8/2003 | Vancura |
| 6,609,973 B1 | 8/2003 | Weiss |
| 6,612,927 B1 | 9/2003 | Slomiany et al. |
| 6,616,531 B1 | 9/2003 | Mullins |
| 6,620,046 B2 | 9/2003 | Rowe |
| 6,626,758 B1 | 9/2003 | Parham et al. |
| 6,652,378 B2 | 11/2003 | Cannon et al. |
| 6,656,047 B1 | 12/2003 | Tarantino et al. |
| 6,656,048 B2 | 12/2003 | Olsen |
| 6,656,052 B2 | 12/2003 | Abramopoulos et al. |
| 6,659,864 B2 | 12/2003 | McGahn et al. |
| 6,666,765 B2 | 12/2003 | Vancura |
| 6,682,419 B2 | 1/2004 | Webb et al. |
| 6,682,420 B2 | 1/2004 | Webb et al. |
| 6,688,977 B1 | 2/2004 | Baerlocher et al. |
| 6,692,355 B2 | 2/2004 | Baerlocher et al. |
| 6,695,700 B2 | 2/2004 | Walker et al. |
| 6,722,976 B2 | 4/2004 | Adams |
| 6,764,397 B1 | 7/2004 | Robb |
| 7,033,276 B2 | 4/2006 | Walker et al. |
| 7,314,411 B2 | 1/2008 | Lannert et al. |
| 2001/0049303 A1 | 12/2001 | Found |
| 2002/0045475 A1 | 4/2002 | Glavich et al. |
| 2002/0065123 A1 | 5/2002 | Packes, Jr. et al. |
| 2002/0071557 A1 | 6/2002 | Nguyen |
| 2002/0094855 A1 | 7/2002 | Berman |
| 2002/0116615 A1 | 8/2002 | Nguyen et al. |
| 2002/0132658 A1 | 9/2002 | Brown et al. |
| 2002/0138594 A1 | 9/2002 | Rowe |
| 2002/0142822 A1 | 10/2002 | Baerlocher et al. |
| 2002/0142829 A1 | 10/2002 | Inoue |
| 2002/0152120 A1 | 10/2002 | Howington |
| 2002/0165023 A1 | 11/2002 | Brosnan et al. |
| 2002/0187834 A1 | 12/2002 | Rowe et al. |
| 2002/0193162 A1 | 12/2002 | Walker et al. |
| 2002/0198036 A1 | 12/2002 | Baerlocher et al. |
| 2003/0027625 A1 | 2/2003 | Rowe |
| 2003/0027630 A1 | 2/2003 | Kelly et al. |
| 2003/0040360 A1 | 2/2003 | Kaminkow |
| 2003/0045350 A1 | 3/2003 | Baerlocher et al. |
| 2003/0050111 A1 | 3/2003 | Saffari |
| 2003/0054878 A1 | 3/2003 | Benoy et al. |
| 2003/0060254 A1 | 3/2003 | Cuddy et al. |
| 2003/0060266 A1 | 3/2003 | Baerlocher |
| 2003/0060269 A1 | 3/2003 | Paulsen et al. |
| 2003/0060272 A1 | 3/2003 | Glavich et al. |
| 2003/0060279 A1 | 3/2003 | Torango |
| 2003/0064772 A1 | 4/2003 | Tempest et al. |
| 2003/0064773 A1 | 4/2003 | Baerlocher et al. |
| 2003/0064785 A1 | 4/2003 | Stone et al. |
| 2003/0069056 A1 | 4/2003 | Cormack et al. |
| 2003/0069064 A1 | 4/2003 | Ainsworth |
| 2003/0073482 A1 | 4/2003 | Baerlocher et al. |
| 2003/0083943 A1 | 5/2003 | Adams et al. |
| 2003/0092484 A1 | 5/2003 | Schneider et al. |
| 2003/0119583 A1 | 6/2003 | Kaminkow et al. |
| 2003/0162584 A1 | 8/2003 | Hughs-Baird et al. |
| 2003/0162585 A1 | 8/2003 | Bigelow et al. |
| 2003/0181231 A1 | 9/2003 | Vancura et al. |
| 2003/0199321 A1 | 10/2003 | Williams |
| 2003/0207710 A1 | 11/2003 | Rodgers et al. |
| 2003/0211879 A1 | 11/2003 | Englman |
| 2003/0211884 A1 | 11/2003 | Gauselmann |
| 2003/0216166 A1 | 11/2003 | Baerlocher et al. |
| 2003/0222402 A1 | 12/2003 | Olive |
| 2003/0228904 A1 | 12/2003 | Acres et al. |
| 2003/0232640 A1 | 12/2003 | Walker et al. |
| 2003/0232647 A1 | 12/2003 | Moser |
| 2003/0236116 A1 | 12/2003 | Marks et al. |

(56) References Cited

U.S. PATENT DOCUMENTS

| | | | |
|---|---|---|---|
| 2004/0009811 A1 | 1/2004 | Torango | |
| 2004/0017041 A1 | 1/2004 | Inoue | |
| 2004/0029631 A1 | 2/2004 | Duhamel | |
| 2007/0004508 A1 | 1/2007 | Walker et al. | |
| 2010/0120505 A1* | 5/2010 | Caputo et al. | 463/20 |
| 2012/0270641 A1* | 10/2012 | Baerlocher et al. | 463/25 |
| 2013/0072282 A1* | 3/2013 | Nicely | 463/20 |
| 2013/0157753 A1* | 6/2013 | De Waal et al. | 463/25 |
| 2013/0316803 A1* | 11/2013 | Caputo et al. | 463/25 |

FOREIGN PATENT DOCUMENTS

| | | |
|---|---|---|
| AU | 630112 | 10/1990 |
| AU | 628330 | 9/1992 |
| AU | 633469 | 1/1993 |
| AU | 649009 | 5/1994 |
| AU | 655801 | 1/1995 |
| AU | 680920 | 8/1997 |
| AU | 710015 | 9/1997 |
| AU | 733599 | 10/1997 |
| AU | 722969 | 6/1998 |
| AU | 199863553 | 10/1998 |
| AU | 707687 | 7/1999 |
| AU | 709724 | 9/1999 |
| AU | 711501 | 10/1999 |
| AU | 714299 | 12/1999 |
| AU | 716299 | 2/2000 |
| AU | 721968 | 7/2000 |
| AU | 722107 | 7/2000 |
| AU | 728788 | 1/2001 |
| AU | 20011000033 | 11/2001 |
| AU | 748263 | 5/2002 |
| AU | 749222 | 6/2002 |
| AU | 750731 | 7/2002 |
| AU | 754689 | 11/2002 |
| AU | 758306 | 3/2003 |
| DE | 2844124 | 4/1980 |
| DE | 3415114 | 10/1985 |
| DE | 8710757 | 11/1987 |
| DE | 3638100 | 5/1988 |
| DE | 3830648 | 3/1990 |
| DE | 3917683 | 12/1990 |
| DE | 4126287 | 2/1993 |
| DE | 4200254 | 8/1993 |
| DE | 4301855 | 7/1994 |
| DE | 19600787 | 5/1997 |
| DE | 19613455 | 8/1997 |
| DE | 19936196 | 1/2001 |
| EP | 0342797 | 11/1989 |
| EP | 0444932 | 9/1991 |
| EP | 0449433 | 10/1991 |
| EP | 0798676 | 10/1997 |
| EP | 0874337 | 10/1998 |
| EP | 0926645 | 6/1999 |
| EP | 0944030 | 9/1999 |
| EP | 0945837 | 9/1999 |
| EP | 0981119 | 2/2000 |
| EP | 0984408 | 3/2000 |
| EP | 0984409 | 3/2000 |
| EP | 1003138 | 5/2000 |
| GB | 912685 | 12/1962 |
| GB | 2083936 | 3/1982 |
| GB | 2096376 | 10/1982 |
| GB | 2097160 | 10/1982 |
| GB | 2100905 | 1/1983 |
| GB | 2117155 | 10/1983 |
| GB | 2117952 | 10/1983 |
| GB | 2118445 | 11/1983 |
| GB | 2137392 | 10/1984 |
| GB | 2139390 | 11/1984 |
| GB | 2142457 | 1/1985 |
| GB | 2144644 | 3/1985 |
| GB | 2147773 | 5/1985 |
| GB | 2148135 | 5/1985 |
| GB | 2151054 | 7/1985 |
| GB | 2153572 | 8/1985 |
| GB | 2161008 | 1/1986 |
| GB | 2161009 | 1/1986 |
| GB | 2170636 | 8/1986 |
| GB | 2180682 | 4/1987 |
| GB | 2181589 | 4/1987 |
| GB | 2183882 | 6/1987 |
| GB | 2191030 | 12/1987 |
| GB | 2201821 | 9/1988 |
| GB | 2222712 | 3/1990 |
| GB | 2226436 | 6/1990 |
| GB | 2226907 | 7/1990 |
| GB | 2231189 | 11/1990 |
| GB | 2282690 | 4/1995 |
| GB | 2322217 | 8/1998 |
| GB | 2328311 | 2/1999 |
| GB | 2333880 | 8/1999 |
| GB | 2353128 | 2/2001 |
| GB | 2383668 | 7/2003 |
| GB | 2387703 | 10/2003 |
| JP | 07-308439 A | 11/1995 |
| JP | 09-173630 A | 7/1997 |
| WO | WO9412256 | 6/1994 |
| WO | WO9522811 | 8/1995 |
| WO | WO9530944 | 11/1995 |
| WO | WO9712338 | 4/1997 |
| WO | WO9727568 | 7/1997 |
| WO | WO9732285 | 9/1997 |
| WO | WO9835309 | 8/1998 |
| WO | WO9847115 | 10/1998 |
| WO | WO9851384 | 11/1998 |
| WO | WO9903078 | 1/1999 |
| WO | WO9910849 | 3/1999 |
| WO | WO0012186 | 3/2000 |
| WO | WO0032286 | 6/2000 |
| WO | WO0066235 | 11/2000 |
| WO | WO0076606 | 12/2000 |
| WO | WO0110523 | 2/2001 |
| WO | WO0115055 | 3/2001 |
| WO | WO0115790 | 3/2001 |
| WO | WO0126019 | 4/2001 |
| WO | WO03030066 | 4/2003 |

OTHER PUBLICATIONS

Briscoe, James, "Urban Renewal", Casino Spain, Jun. 1997, p. 42.
Office Action for U.S. Appl. No. 09/001,902 dated Sep. 30, 1999.
Office Action for U.S. Appl. No. 09/001,902 dated Jan. 6, 2000.
Office Action for U.S. Appl. No. 09/001,902 dated Jul. 17, 1999.
Notice of Allowance for U.S. Appl. No. 09/001,902 dated Nov. 14, 2000.
Office Action for U.S. Appl. No. 09/783,251 dated Oct. 23, 2002.
Notice of Allowance for U.S. Appl. No. 09/783,251 dated Sep. 23, 2003.
Office Action for U.S. Appl. No. 10/770,231 dated Jan. 9, 2008.
Office Action for U.S. Appl. No. 10/770,231 dated Jul. 24, 2008.
Office Action for U.S. Appl. No. 10/428,413 dated Oct. 9, 2007.
Office Action for U.S. Appl. No. 10/428,413 dated Sep. 9, 2008.
Office Action for U.S. Appl. No. 11/428,419 dated Oct. 10, 2007.
Office Action for U.S. Appl. No. 10/428,419 dated May 14, 2008.
Office Action for U.S. Appl. No. 10/428,419 dated Nov. 28, 2008.
Office Action for U.S. Appl. No. 13/197,501 dated May 17, 2012.
Office Action for U.S. Appl. No. 11/428,419 dated May 30, 2012.
Letter from Marvin A. Motsenbocker of Mots Law dated Feb. 14, 2012 regarding Third Party Submission in Published Application Under 37 C.F.R. 1.99 filed for U.S. Appl. No. 13/212,618 (1 page).
Third Party Submission in Published Application Under 37 C.F.R. 1.99 filed for U.S. Appl. No. 13/212,618, dated Feb. 14, 2012 (3 pages).
Partially-highlighted JP 07-308439 A and English translation of paragraph [0027] of same submitted with Third Party Submission in Published Application Under 37 C.F.R. 1.99 for U.S. Appl. No. 13/212,618 (3 pages).
Partially-highlighted JP 09-173630 A and English translation of paragraph [0017] of same submitted with Third Party Submission in Published Application Under 37 C.F.R. 1.99 for U.S. Appl. No. 13/212,618 (3 pages).
Office Action for U.S. Appl. No. 13/889,891 dated Oct. 11, 2013.

* cited by examiner

30

| OUTCOME DESCRIPTION 100 | NUMBER OF ARRANGEMENTS OF ELEMENTS 102 | PROBABILITY 104 | RANDOM NUMBER RANGE 106 |
|---|---|---|---|
| NONWINNING COMBINATION | 8570 | 80.48% | 1-8570 |
| CHERRY/ANY/ANY | 680 | 6.386% | 8571-9250 |
| ANY/ANY/CHERRY | 680 | 6.386% | 9251-9930 |
| CHERRY/CHERRY/ANY | 200 | 1.878% | 9931-10130 |
| ANY/CHERRY/CHERRY | 200 | 1.878% | 10131-10330 |
| CHERRY/ANY/CHERRY | 68 | 0.639% | 10331-10398 |
| CHERRY/CHERRY/CHERRY | 20 | 0.188% | 10399-10418 |
| BAR/ORANGE/ORANGE | 42 | 0.394% | 10419-10460 |
| ORANGE/ORANGE/BAR | 6 | 0.056% | 10461-10466 |
| ORANGE/ORANGE/ORANGE | 42 | 0.394% | 10467-10508 |
| BAR/PLUM/PLUM | 20 | 0.188% | 10509-10528 |
| PLUM/PLUM/BAR | 5 | 0.047% | 10529-10533 |
| PLUM/PLUM/PLUM | 50 | 0.470% | 10534-10583 |
| BAR/BELL/BELL | 4 | 0.038% | 10584-10587 |
| BELL/BELL/BAR | 20 | 0.188% | 10588-10607 |
| BELL/BELL/BELL | 20 | 0.188% | 10608-10627 |
| BAR/BAR/BAR | 20 | 0.188% | 10628-10647 |
| 7/7/7 | 1 | 0.009% | 10648 |

110 → (ORANGE/ORANGE/ORANGE row)
112 → (BAR/BELL/BELL row)

FIG. 4

| OUTCOME DESCRIPTION 122 | PAYOUT 124 | PROBABILITY 126 | EXPECTED PAYOUT 128 |
|---|---|---|---|
| NONWINNING COMBINATION | 0 | 80.48% | 0 |
| CHERRY/ANY/ANY | 2 | 6.386% | 0.128 |
| ANY/ANY/CHERRY | 2 | 6.386% | 0.128 |
| CHERRY/CHERRY/ANY | 5 | 1.878% | 0.094 |
| ANY/CHERRY/CHERRY | 5 | 1.878% | 0.094 |
| CHERRY/ANY/CHERRY | 5 | 0.639% | 0.032 |
| CHERRY/CHERRY/CHERRY | 20 | 0.188% | 0.038 |
| BAR/ORANGE/ORANGE | 14 | 0.394% | 0.055 |
| ORANGE/ORANGE/BAR | 14 | 0.056% | 0.008 |
| ORANGE/ORANGE/ORANGE | 20 | 0.394% | 0.079 |
| BAR/PLUM/PLUM | 10 | 0.188% | 0.019 |
| PLUM/PLUM/BAR | 10 | 0.047% | 0.005 |
| PLUM/PLUM/PLUM | 20 | 0.470% | 0.094 |
| BAR/BELL/BELL | 18 | 0.038% | 0.007 |
| BELL/BELL/BAR | 18 | 0.188% | 0.034 |
| BELL/BELL/BELL | 20 | 0.188% | 0.038 |
| BAR/BAR/BAR | 50 | 0.188% | 0.094 |
| 7/7/7 | 100 | 0.009% | 0.009 |

FIG. 5

| OUTCOME DESCRIPTION | PAYOUT | EXPECTED PAYOUT |
|---|---|---|
| CHERRY/ANY/ANY | 2 | 0.128 |
| ANY/ANY/CHERRY | 2 | 0.128 |
| CHERRY/CHERRY/ANY | 5 | 0.094 |
| ANY/CHERRY/CHERRY | 5 | 0.094 |
| CHERRY/ANY/CHERRY | 5 | 0.032 |
| CHERRY/CHERRY/CHERRY | 20 | 0.038 |
| BAR/ORANGE/ORANGE | 14 | 0.055 |
| ORANGE/ORANGE/BAR | 14 | 0.008 |
| ORANGE/ORANGE/ORANGE | 20 | 0.079 |
| BAR/PLUM/PLUM | 10 | 0.019 |
| PLUM/PLUM/BAR | 10 | 0.005 |
| PLUM/PLUM/PLUM | 20 | 0.094 |
| BAR/BELL/BELL | 18 | 0.007 |
| BELL/BELL/BAR | 18 | 0.034 |
| BELL/BELL/BELL | 20 | 0.038 |
| BAR/BAR/BAR | 50 | 0.094 |
| 7/7/7 | 100 | 0.009 |

210

| OUTCOME DESCRIPTION | PAYOUT | EXPECTED PAYOUT |
|---|---|---|
| CHERRY/ANY/ANY | 2 | 0.128 |
| ANY/ANY/CHERRY | 2 | 0.128 |
| CHERRY/CHERRY/ANY | 5 | 0.094 |
| ANY/CHERRY/CHERRY | 5 | 0.094 |
| CHERRY/ANY/CHERRY | 5 | 0.032 |
| CHERRY/CHERRY/CHERRY | 20 | 0.038 |
| BAR/ORANGE/ORANGE | 14 | 0.055 |
| ORANGE/ORANGE/BAR | 14 | 0.008 |
| ORANGE/ORANGE/ORANGE | 20 | 0.079 |
| BAR/PLUM/PLUM | 10 | 0.019 |
| PLUM/PLUM/BAR | 10 | 0.005 |
| PLUM/PLUM/PLUM | 20 | 0.094 |
| BAR/BELL/BELL | 18 | 0.007 |
| BELL/BELL/BAR | 18 | 0.034 |
| BELL/BELL/BELL | 20 | 0.038 |
| BAR/BAR/BAR | 50 | 0.094 |
| 7/7/7 | 150 | 0.014 |

212 → (points to 7/7/7 row)

| OUTCOME DESCRIPTION | PAYOUT | EXPECTED PAYOUT |
|---|---|---|
| CHERRY/ANY/ANY | 2 | 0.128 |
| ANY/ANY/CHERRY | 2 | 0.128 |
| CHERRY/CHERRY/ANY | 5 | 0.094 |
| ANY/CHERRY/CHERRY | 5 | 0.094 |
| CHERRY/ANY/CHERRY | 5 | 0.032 |
| CHERRY/CHERRY/CHERRY | 20 | 0.038 |
| BAR/ORANGE/ORANGE | 14 | 0.055 |
| ORANGE/ORANGE/BAR | 14 | 0.008 |
| ORANGE/ORANGE/ORANGE | 20 | 0.079 |
| BAR/PLUM/PLUM | 10 | 0.019 |
| PLUM/PLUM/BAR | 10 | 0.005 |
| PLUM/PLUM/PLUM | 20 | 0.094 |
| BAR/BELL/BELL | 18 | 0.007 |
| BELL/BELL/BAR | 18 | 0.034 |
| BELL/BELL/BELL | 20 | 0.038 |
| BAR/BAR/BAR | 50 | 0.094 |
| 7/7/7 | 200 | 0.019 |

212 ⟶ (points to 7/7/7 row)

| SPEED IDENTIFIER 258 | SPEED OF PLAY 260 | MULTIPLIER TO PAYOUT TABLE 262 |
|---|---|---|
| A | LESS THAN 4 GAMES PER MINUTE | 1.00 |
| B | 4-8 GAMES PER MINUTE | 1.02 |
| C | MORE THAN 8 GAMES PER MINUTE | 1.04 |

252 → (row A)
254 → (row B)
256 → (row C)

| OUTCOME DESCRIPTION | PAYOUT | EXPECTED PAYOUT |
|---|---|---|
| CHERRY/ANY/ANY | 2 | 0.128 |
| ANY/ANY/CHERRY | 2 | 0.128 |
| CHERRY/CHERRY/ANY | 5 | 0.094 |
| ANY/CHERRY/CHERRY | 5 | 0.094 |
| CHERRY/ANY/CHERRY | 5 | 0.032 |
| CHERRY/CHERRY/CHERRY | 20 | 0.038 |
| BAR/ORANGE/ORANGE | 14 | 0.055 |
| ORANGE/ORANGE/BAR | 14 | 0.008 |
| ORANGE/ORANGE/ORANGE | 20 | 0.079 |
| BAR/PLUM/PLUM | 10 | 0.019 |
| PLUM/PLUM/BAR | 10 | 0.005 |
| PLUM/PLUM/PLUM | 20 | 0.094 |
| BAR/BELL/BELL | 18 | 0.007 |
| BELL/BELL/BAR | 18 | 0.034 |
| BELL/BELL/BELL | 20 | 0.038 |
| BAR/BAR/BAR | 50 | 0.094 |
| 7/7/7 | 100 | 0.009 |

| OUTCOME DESCRIPTION | PAYOUT | EXPECTED PAYOUT |
|---|---|---|
| CHERRY/ANY/ANY | 2 | 0.128 |
| ANY/ANY/CHERRY | 2 | 0.128 |
| CHERRY/CHERRY/ANY | 5 | 0.094 |
| ANY/CHERRY/CHERRY | 5 | 0.094 |
| CHERRY/ANY/CHERRY | 5 | 0.032 |
| CHERRY/CHERRY/CHERRY | 20 | 0.038 |
| BAR/ORANGE/ORANGE | 14 | 0.055 |
| ORANGE/ORANGE/BAR | 14 | 0.008 |
| ORANGE/ORANGE/ORANGE | 20 | 0.079 |
| BAR/PLUM/PLUM | 10 | 0.019 |
| PLUM/PLUM/BAR | 10 | 0.005 |
| PLUM/PLUM/PLUM | 20 | 0.094 |
| BAR/BELL/BELL | 18 | 0.007 |
| BELL/BELL/BAR | 18 | 0.034 |
| BELL/BELL/BELL | 20 | 0.038 |
| BAR/BAR/BAR | 51 | 0.096 |
| 7/7/7 | 102 | 0.010 |

FIG. 10B

| OUTCOME DESCRIPTION | PAYOUT | EXPECTED PAYOUT |
|---|---|---|
| CHERRY/ANY/ANY | 2 | 0.128 |
| ANY/ANY/CHERRY | 2 | 0.128 |
| CHERRY/CHERRY/ANY | 5 | 0.094 |
| ANY/CHERRY/CHERRY | 5 | 0.094 |
| CHERRY/ANY/CHERRY | 5 | 0.032 |
| CHERRY/CHERRY/CHERRY | 20 | 0.038 |
| BAR/ORANGE/ORANGE | 14 | 0.055 |
| ORANGE/ORANGE/BAR | 14 | 0.008 |
| ORANGE/ORANGE/ORANGE | 20 | 0.079 |
| BAR/PLUM/PLUM | 10 | 0.019 |
| PLUM/PLUM/BAR | 10 | 0.005 |
| PLUM/PLUM/PLUM | 20 | 0.094 |
| BAR/BELL/BELL | 18 | 0.007 |
| BELL/BELL/BAR | 18 | 0.034 |
| BELL/BELL/BELL | 20 | 0.038 |
| BAR/BAR/BAR | 53 | 0.100 |
| 7/7/7 | 106 | 0.010 |

FIG. 10C

GAME BASED ON SPEED OF PLAY

PRIORITY CLAIM

This application is a continuation of, claims the benefit of and priority to U.S. patent application Ser. No. 13/889,891, filed on May 8, 2013, which is a continuation of, claims the benefit of and priority to U.S. patent application Ser. No. 13/212,618, filed on Aug. 18, 2011, now U.S. Pat. No. 8,439,739, which is a continuation of, claims the benefit of and priority to U.S. patent application Ser. No. 10/790,167, filed on Mar. 1, 2004, now U.S. Pat. No. 8,021,222, which claims the benefit of and priority to U.S. Provisional Patent Application No. 60/451,573, filed on Mar. 3, 2003 and which is a continuation-in-part of, claims the benefit of and priority to U.S. patent application Ser. No. 09/783,251, filed on Feb. 14, 2001, now U.S. Pat. No. 6,695,700, which is a continuation of, claims the benefit of and priority to U.S. patent application Ser. No. 09/001,902, filed on Dec. 31, 1997, now U.S. Pat. No. 6,238,288, the entire contents of which are each incorporated by reference herein.

BACKGROUND OF THE INVENTION

The present invention relates to amusement devices, and more specifically to electronic chance devices.

Casinos and other entities that derive revenue from gaming devices, such as slot machines, video poker machines and video blackjack machines, attempt to maximize revenue. Gaming devices generate revenue in accordance with the following equation:

REVENUE=(HOUSE EDGE)×(HOURS PLAYED)×(PLAYS/HOUR)

Of the above three variables, two, Hours Played and Plays/Hour, are directly controlled by the player, and are thus difficult for a casino to change. The third, House Edge, is directly controlled by a casino but is nonetheless difficult to change for regulatory reasons. In addition, increasing House Edge can affect other variables to actually decrease revenue, as is described below.

Players are primarily concerned with finding a gaming device with a low "House Edge", also known as "hold percentage" (average percentage of wagered money which is kept by the gaming device per game). Equivalently, players are primarily concerned with finding a gaming device with a high "payout percentage" (100% less House Edge, which equals the average percentage of wagered money which is returned to a player per game). Low hold percentages (high payout percentages) are a significant factor in attracting players to one casino rather than another. Accordingly, many casinos advertise that they have gaming devices with very high payout percentages.

Although a high payout percentage (low House Edge) may attract players, it also results in lower revenue. Casinos, of course, would prefer higher revenue, and may increase the House Edge to increase revenue. Paradoxically, increasing the House Edge does not always increase revenue. The House Edges of gaming devices are often displayed in publications or on the gaming device itself. Many players will avoid gaming devices that they believe to have low payout percentages, or high House Edges. Thus, if the House Edge is increased on certain gaming devices, the Hours Played or Plays/Hour on those gaming devices may decrease, and revenues may likewise decrease.

In addition, when a casino wants to adjust the hold percentage of a slot machine, state and/or local regulations may require that the machine be removed from the casino floor, adjusted accordingly, then reactivated. Accordingly, some casinos may be reluctant to increase the House Edge of gaming devices in an attempt to increase revenues from those devices.

Increasing the Hours Played is difficult or impossible because a casino cannot easily modify player behavior. Casinos typically remove clocks from the view of players, make the seats and playing area more comfortable and serve free drinks in an attempt to modify player behavior. Additionally, the gaming devices themselves have become increasingly more entertaining in order to entice the player to play longer. Such measures may, at best, indirectly increase the Hours Played, but do not necessarily increase the Hours Played significantly or at all.

Increasing the Plays/Hour (speed of game play) is likewise difficult or impossible. Efforts to increase this factor include providing a spin button, rather than a handle, on some slot machines, allowing the player to initiate each game quickly. In addition, some slot machines have faster stopping reels, which end each game more quickly. Furthermore, a group of gaming machines may be in communication over a network, allowing each of a group of players to influence the movement of an object in a race, such as a horse race or car race. Such a racing game may make some players play faster than they would have. However, other players view such a game as annoyingly complicated and do not participate.

Casinos may also sponsor tournaments, in which the first player to win a jackpot or reach a certain score wins a prize. Casinos may also organize player clubs, in which players receive points for the number of plays or amounts wagered. Such points can be redeemed for goods and services once the player has reached a certain threshold. Casinos may also offer players the chance to win a "progressive jackpot", which increases over time and is typically available to all players in a casino playing slot machines. When a progressive jackpot reaches a large dollar amount, players typically play rapidly in an attempt to win that jackpot. Since each player knows that all other players have a chance to win, they play faster in an attempt to increase their chances of winning the jackpot. However, other players are not attracted by such casino promotions, and theft playing behavior is thus unaffected by the promotions.

In summary, it would be advantageous to increase a player's attraction to a gaming device.

BRIEF DESCRIPTION OF THE DRAWINGS

FIG. 4 is a schematic illustration of an outcome probabilities database of the electronic gaming device of FIG. 1.

FIG. 5 is a schematic illustration of an exemplary payout table of the electronic gaming device of FIG. 1.

FIGS. 8A, 8B and 8C are schematic illustrations of the payout tables of FIG. 7.

FIG. 9 is a schematic illustration of another embodiment of a selection table of the electronic gaming device of FIG. 1.

FIGS. 10A, 10B and 10C are schematic illustrations of payout tables calculated in accordance with the selection table of FIG. 9.

DETAILED DESCRIPTION OF THE PREFERRED EMBODIMENTS

Applicants have recognized that it is possible to increase the speed of play (Plays/Hour) of a gaming device significantly, and thereby significantly increase the revenue. Players typically do not consider the speed of play, but instead attempt to find a gaming device with a low House Edge. Accordingly, a gaming device that is played rapidly will not discourage players, and can thus generate more revenue by providing an incentive to play faster and for longer periods of time. Such a gaming device may generate so much revenue that the higher payout percentage will be offset.

By offering an incentive to play faster, a gaming device will typically be played more often over time than those devices that do not provide such an incentive. The casino can in turn derive greater revenue from the gaming device, even though the player is afforded a higher payout percentage.

In jurisdictions which require a gaming device to be monitored, the gaming device could maintain an audit trail for later review by regulators. Thus, the gaming device could automatically adjust the hold percentages as desired while conforming to regulatory requirements.

As will be understood by those skilled in the art, the drawings and accompanying descriptions presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Figure 1:
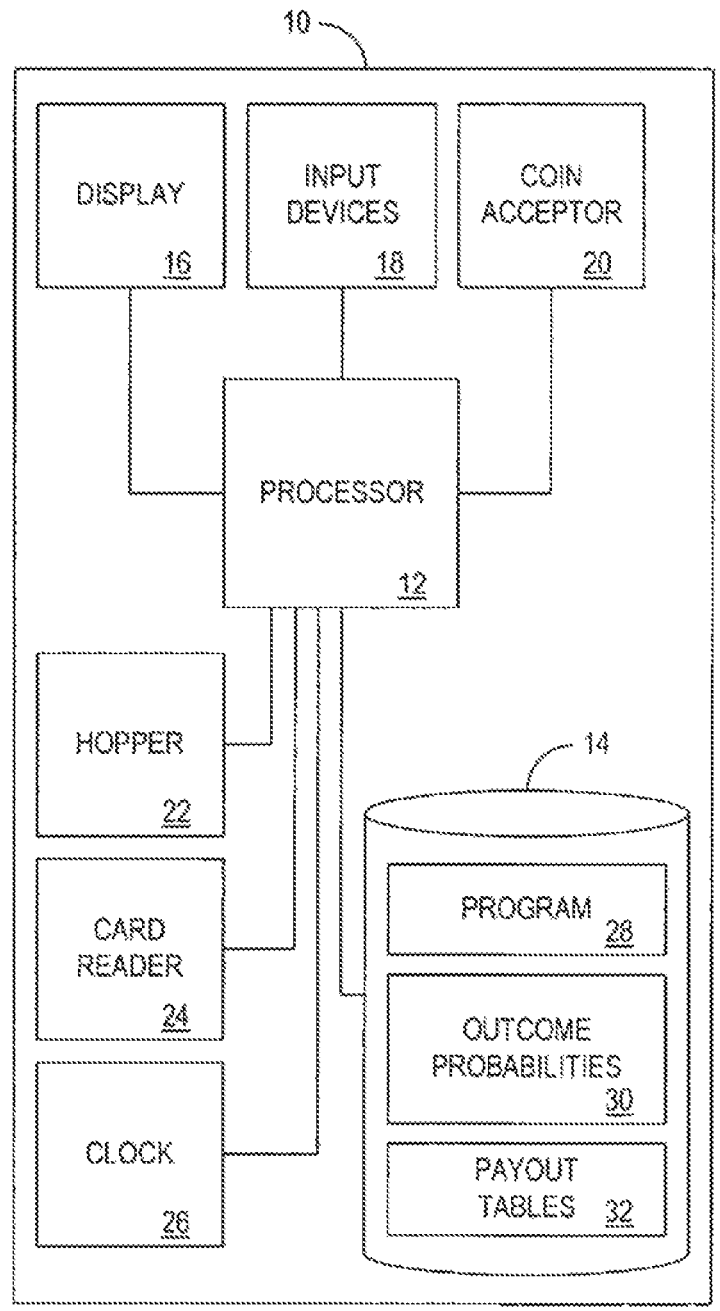
FIG. 1 is a schematic illustration of an electronic gaming device provided in accordance with the present invention.

Referring to FIG. 1, a gaming device 10 comprises a processor 12, such as one or more conventional microprocessors, which is in communication with a data storage device 14, such as an appropriate combination of magnetic, optical and/or semiconductor memory. The processor 12 and the storage device 14 may each be (i) located entirely within a single computer or other computing device; (ii) connected to each other by a remote communication link, such as a serial port cable, telephone line or radio frequency transceiver; or (iii) a combination thereof. For example, the gaming device 10 may comprise one or more computers which are connected to a remote server computer for maintaining databases.

The processor 12 is further in communication with a display 16 and player input devices 18. The display 16 is a graphical display device, such as a video monitor of a type used in conventional electronic gaming devices, for displaying images generated by the processor 12 during a game. Such images are described below. The display 16 need not be included in certain types of gaming devices, such as purely mechanical slot machines. The player input devices 18 include input devices well known in the art, such as a touch screen for generating a signal indicative of a location on the touch screen that is touched or pressed by a player, and/or buttons which indicate player commands and selections when actuated. Other input devices will be understood by those skilled in the art.

The processor 12 is further in communication with a coin acceptor 20 for generating a signal indicative of the number of coins inserted and their type. The coin acceptor 20 thereby allows the processor 12 to determine an amount of funds which are deposited by a player and retained in a coin reservoir (not shown). A hopper 22 for dispensing coins from the coin reservoir (not shown) is in communication with the processor 12. When the player requests to "cash out" (receive all funds he is due), the processor determines if the player is due any funds ("credit"). If so, the processor 12 directs the hopper 22 to release an appropriate number and type of coins in a known manner.

The processor 12 is further in communication with a card reader 24 for reading information stored on a player tracking card (not shown). Such a player tracking card may be magnetically encoded with data representing an amount of funds, and/or with data representing a player identifier, such as a player name or account number. Accordingly, a player may use a player tracking card instead of inserting coins into and receiving coins from the gaming device 10. The player identifier can be used in accessing other player-related information stored on a network server or other remote device. Thus, the card reader 24 also allows the processor 12 to receive and transmit player-related information. The card reader 24 may also include a display for displaying the value of funds stored in association with a player tracking card, thereby informing the player of an amount of funds available.

A clock 26 in communication with the processor 12 generates signals that indicate time. Thus, the processor 12 may ascertain the time of day or the time that has elapsed between two events.

The storage device 14 stores (i) a program 28 for controlling the processor 12; (ii) an outcome probabilities database 30 for indicating probabilities of game outcomes; and (iii) one or more payout tables 32 for indicating payouts (funds won) for game outcomes. The processor 12 performs instructions of the program 28, thereby operating in accordance with the present invention, and particularly in accordance with the methods described in detail herein. For example, the program 28 stores data indicative of game rules and elements. The program 28 furthermore includes program elements that may be necessary, such as an operating system and "device drivers" for allowing the processor to interface with computer peripheral devices, such as the hopper 22 and the card reader 24. Appropriate device drivers and other necessary program elements are known to those skilled in the art, and need not be described in detail herein.

In the above-described embodiment, the gaming device 10 is an electronic or electro-mechanical device similar to those used in casinos. As such, the gaming device 10 would include typical components such as the coin acceptor 20, the hopper 22 and/or the card reader 24. In another embodiment, the gaming device 10 may be implemented as software that directs one or more computers, such as conventional personal computers based on Intel Pentium® microprocessors. Furthermore, such software implementations of the gaming device 10 may be operative to implement gaming over networks, such the Internet.

Figure 2:
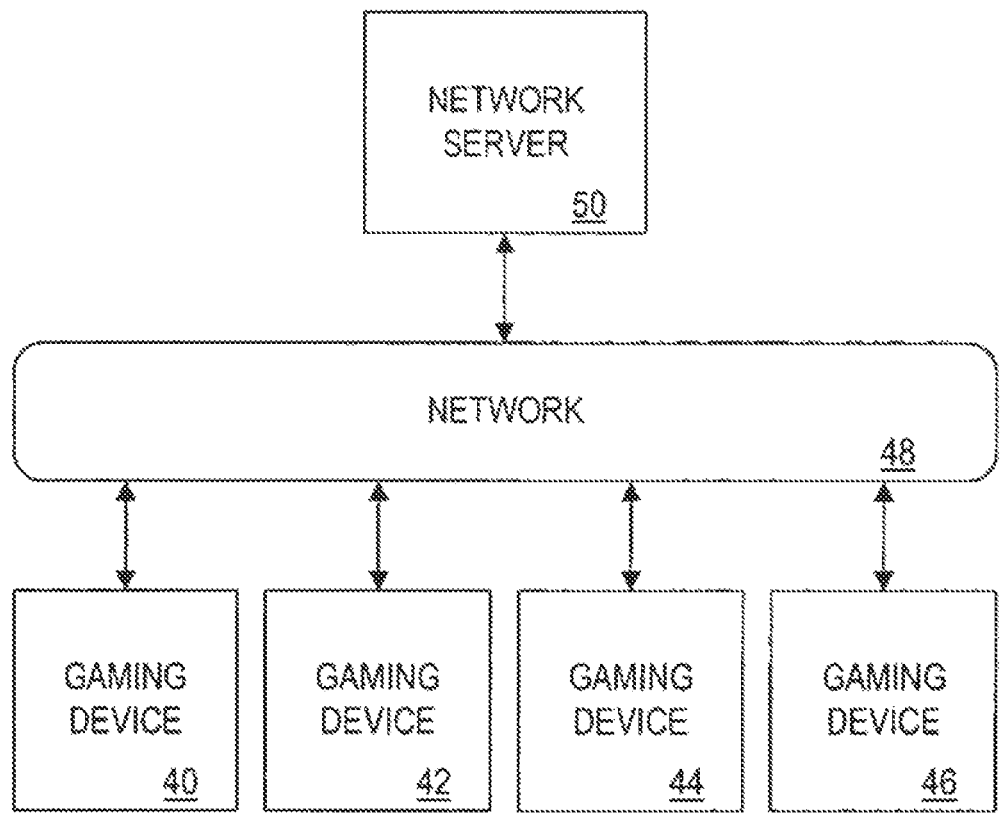
FIG. 2 is a schematic illustration of a plurality of gaming devices which are in communication with a network server.

Referring to FIG. 2, each of gaming devices 40, 42, 44 and 46 is in communication with a network 48, and is thereby in communication with a network server 50. Communication with the network server 50 allows each gaming device to access player-related information stored on the network server. Those skilled in the art will understand that many types of player-related information may be stored, such as funds and predefined game preferences. Those skilled in the art will also understand that many types of gaming devices may operate in communication with a network server, while many others may operate without any such communication to another device.

Figure 3:
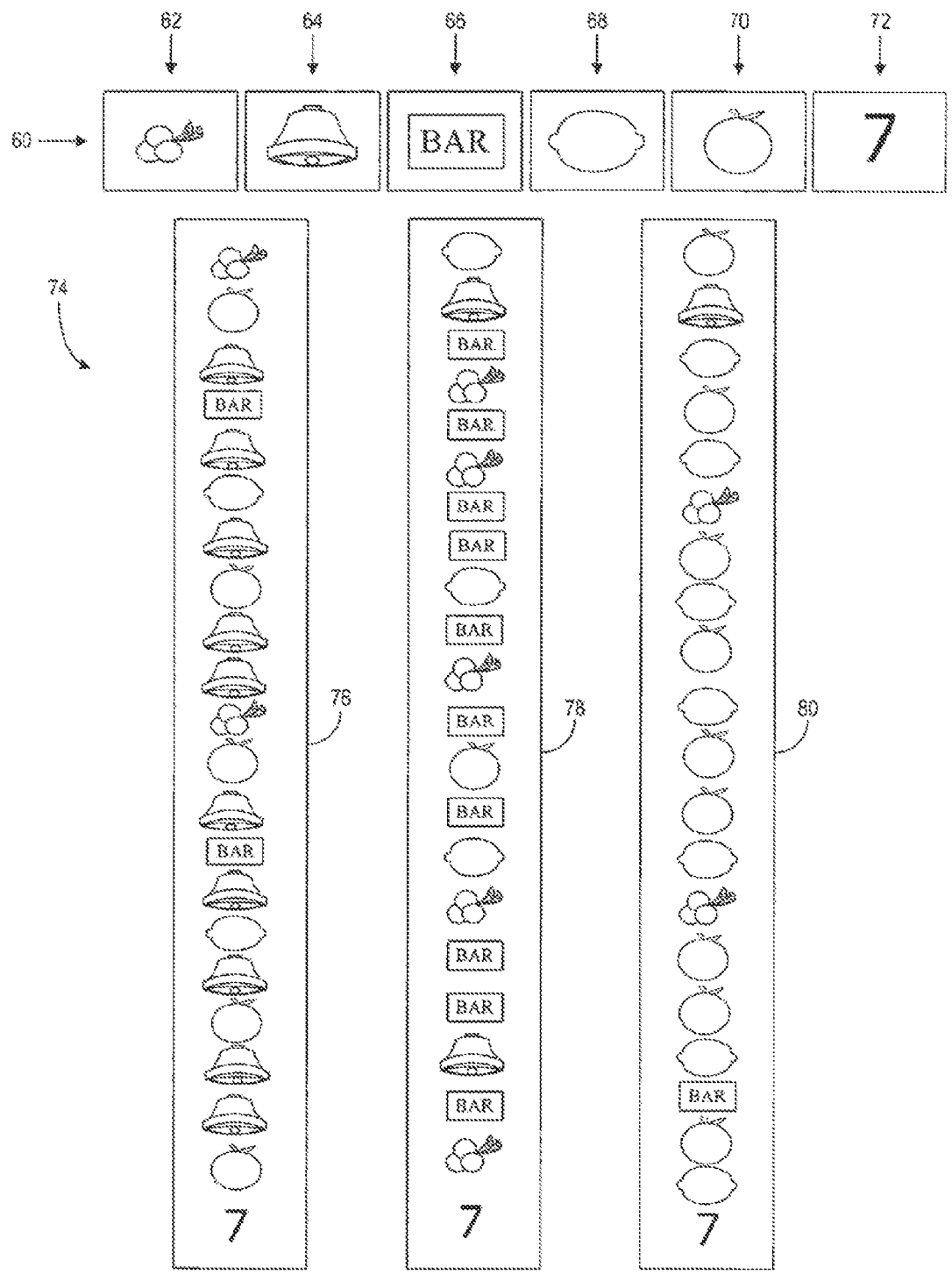
FIG. 3 is a diagrammatic representation of a set of elements of a slot machine-type game, and arrangement of those elements in a slot machine-type game.

Referring to FIG. 3, a set 60 of elements includes all possible elements of a slot machine-type game. The set 60 includes a cherries element 62, a bell element 64, a bar element 66, an orange element 68, a plum element 70 and a seven element 72. During such a game, the device randomly selects one element from each of a plurality of reels, yielding a subset of elements that defines the outcome for that game. For example, one possible subset is a bar element, a plum element and a bell element. Another possible subset is an orange element and two cherry elements.

For each reel in a slot machine-type game, the selected element is one of twenty-two equally likely choices, each choice being one of the set 60 of all possible elements. For example, a plurality 74 of reels includes reels 76, 78 and 80, and the player is randomly provided with an element chosen from each of the reels 76, 78 and 80, thereby yielding a subset that consists of three elements. The three elements define the outcome, and therefore a payout.

It is noted that the number of choices is greater than the number of elements. For example, although there are six elements 62, 64, 66, 68, 70 and 72, there are twenty-two choices on each reel, and therefore there are 10,648 possible arrangements of elements for each game (22×22×22=10,648).

Referring to FIG. 4, the outcome probabilities database 30 of FIG. 1 is shown in detail. Each row of the depicted database represents a database entry, and each entry defines a probability of an outcome occurring. In particular, each entry includes an outcome description 100 which describes the outcome, and a number of arrangements of elements 102 which indicates the number of arrangements of elements which yield the outcome. For example, the entry 110, corresponding to the outcome "orange/orange/orange", indicates that there are forty-two arrangements of elements which yield the outcome "orange/orange/orange". This is because, as shown in FIG. 3, the reel 76 has two orange elements, the reel 78 has three orange elements and the reel 80 has seven orange elements (2×3×7=42). Similarly, the entry 112, corresponding to the outcome "bar/bell/bell", indicates that there are four arrangements of elements which yield the outcome "bar/bell/bell." This is because, as shown in FIG. 3, the reel 76 has two bar elements, the reel 78 has two bell elements and the reel 80 has one bell element (2×2×1=4).

Each entry of the outcome probabilities database 30 further includes a probability 104 which indicates the probability during each game of the outcome occurring. For example, the entry 110, corresponding to the outcome "orange/orange/orange", indicates that there is a probability of 0.394% of the outcome "orange/orange/orange" occurring. This is because, as discussed above, there are forty-two arrangements of elements which yield the outcome "orange/orange/orange", and there are 10,648 possible arrangements of elements (42/10,648=0.00394=0.394%). Similarly, the entry 112, corresponding to the outcome "bar/bell/bell", indicates that there is a probability of 0.038% of the outcome "bar/bell/bell" occurring. This is because, as discussed above, there are four arrangements of elements which yield the outcome "bar/bell/bell", and there are 10,648 possible arrangements of elements (4/10,648=0.00038=0.038%).

Each entry further includes a random number range 106 which indicates a range of random numbers that correspond to an occurrence of the outcome. For example, in the embodiment illustrated by FIG. 4 a random integer from 1 to 10,648 is selected for each game. Accordingly, each integer from 1 to 10,648 corresponds to one of the entries of the outcome probabilities database 30. The random number range 106 for each entry is selected in accordance with the corresponding probability 104. For example, the entry 110 indicates that a randomly selected integer which is from 10,467 to 10,508 corresponds to the outcome "orange/orange/orange". Since the range from 10,467 to 10,508 consists of forty-two integers, and the randomly selected integer may be from 1 to 10,648, the probability of the outcome "orange/orange/orange" occurring is 0.394% (42/10,648=0.00394=0.394%).

Referring to FIG. 5, an exemplary payout table 120 of the payout tables 32 (FIG. 1) is illustrated. Each row of the payout table 120 indicates a payout for an outcome. The payout table 120 thus defines a possible pay schedule for a game. As described below, the actual pay schedule of a game may vary over time, and may correspond to any of a number of payout tables. A pay schedule as used herein indicates the payouts actually provided for outcomes of a game.

Each entry of the payout table 120 includes (i) an outcome description 122 that describes the outcome; (ii) a payout 124 that indicates the number of coins awarded to the player when the outcome occurs, in which the payout 124 is for each coin the player wagers (e.g. payout of four indicates four coins awarded for every coins wagered); (iii) a probability 126 which indicates the probability during each game of the outcome occurring; and (iv) an expected payout 128 which indicates the average number of coins awarded for each game that are due to the outcome. As is known in the art, the expected payout 128 is an "expected value" which is equal to the sum of all products of each payout multiplied by the corresponding probability of the payout occurring. It is noted that the sum of all expected payouts shown in the payout table 120 is approximately 0.954, and as is known the payout percentage is defined as the sum of all expected payouts expressed as a percentage. Thus, the payout percentage of a gaming device operating according to the payout table 120 is approximately 95.4%. Equivalently, the hold percentage, or House Edge, is approximately 4.6%.

Figure 6:
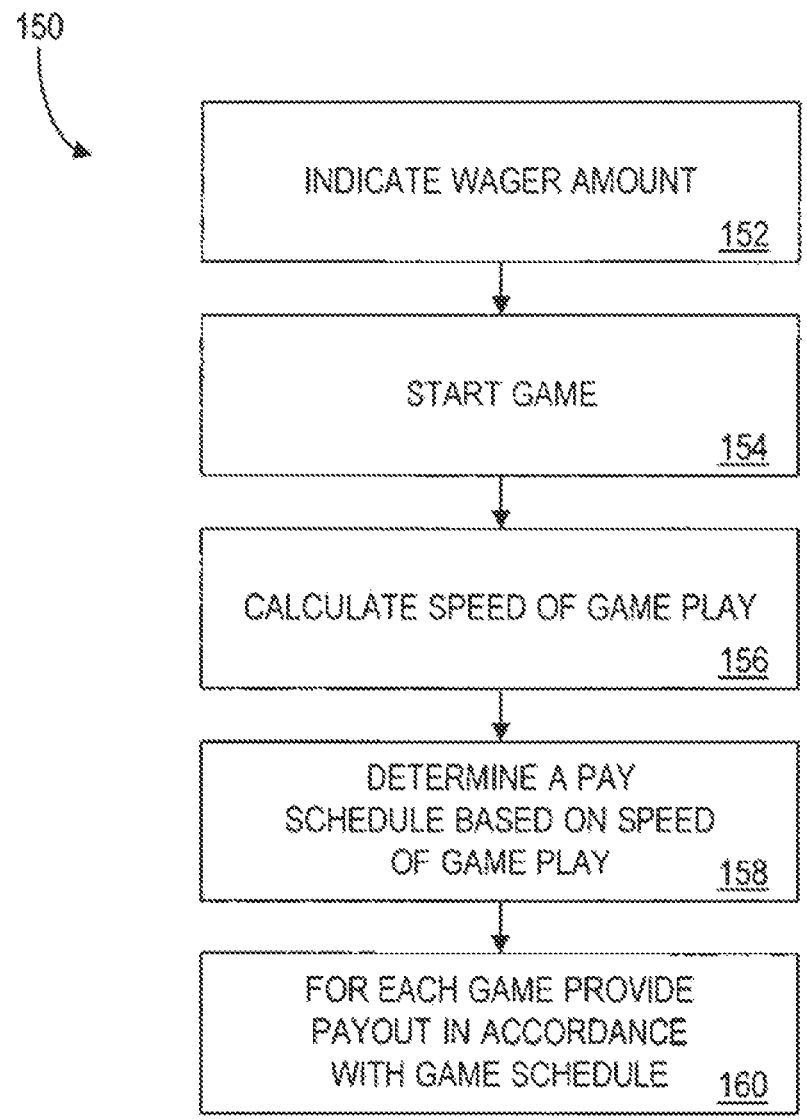
FIG. 6 is a flowchart illustrating a process for directing a game in accordance with the present invention.

Referring to FIG. 6, a process 150 initiates with the payer indicating a wager amount for a game (step 152) and starting the game (step 154). The gaming device 10 (FIG. 1) calculates a speed of game play, as is described below, in any of a number of manners (step 156). Based on the calculated speed of game play, the gaming device determines a pay schedule (step 158). The player is then provided with a payout in accordance with the determined pay schedule (step 160).

The step 156 of calculating a speed of game play may comprise measuring a number of games played in a predetermined time period, measuring a time elapsed between games, or measuring a time elapsed between other events. The clock 26 (FIG. 1) of the gaming device 10 (FIG. 1) may be used to measure a time period and a time elapsed. Such measurements may be initiated upon the start of a game. For example, the clock 26 may measure a time elapsed between consecutive games of a series of games. Similarly the clock 26 may measure a number of games played in a time period that begins upon the start of a game. In other embodiments, measurements may be initiated after a predetermined delay, which may be measured in units of time, number of games or a combination thereof. For example, the speed of game play may be measured as the number of games played within a five minute period, in which the five minute period begins after thirty seconds of a first game being initiated. Alternatively, the speed of game play may be measured as the number of games played within a five minute period, in which the five minute period begins after fifteen games are played within a ninety second time period.

Once the speed of game play is calculated, the gaming device determines a pay schedule based on the calculated speed of game play. In general, a pay schedule may be determined by (i) selecting a payout table from a plurality of payout tables based on the speed of game play, or (ii) multiplying the payout values of a payout table by a multiplier that is based on the speed of game play.

Figure 7:
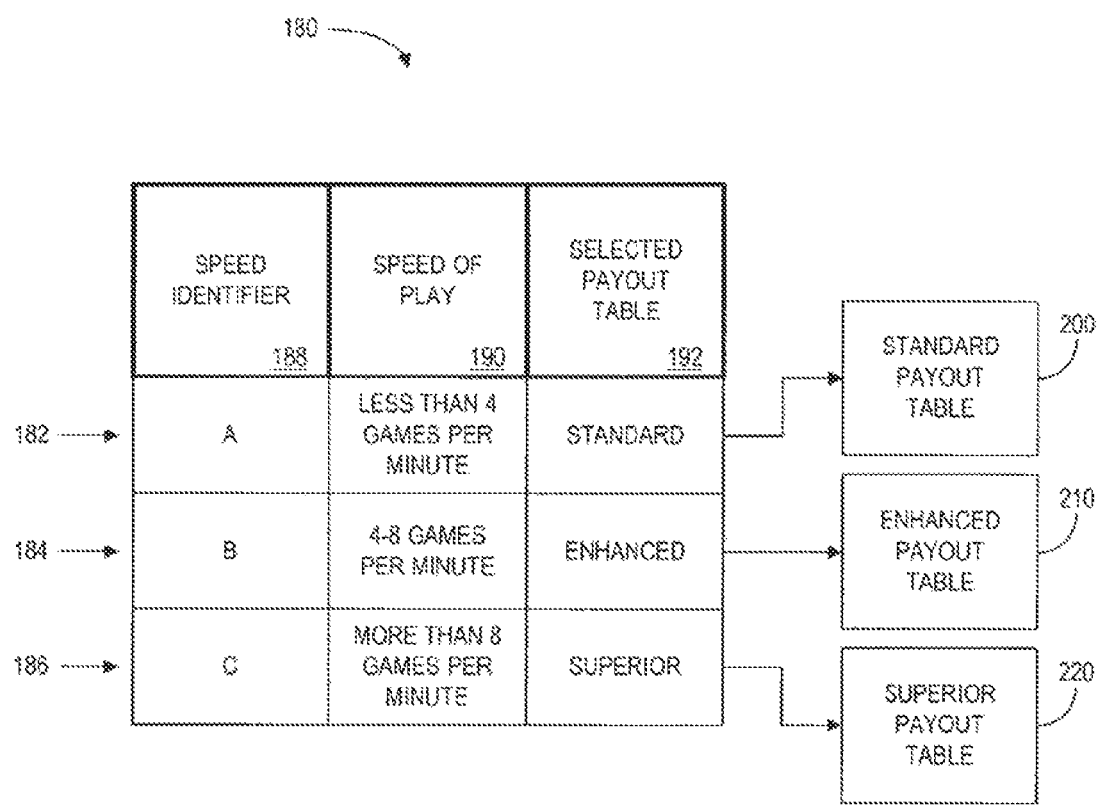
FIG. 7 is a schematic illustration of a selection table and payout tables of the electronic gaming device of FIG. 1.

Referring to FIG. 7, a selection table 180 for selecting a payout table from a plurality of payout tables based on the speed of game play is illustrated. Those skilled in the art will understand that the selection table 180 may be implemented as a database stored in the storage device 14 (FIG. 1), may be implemented by process steps defined by the program 28 (FIG. 1), or a combination thereof. The selection table 180 includes entries 182, 184 and 186, each of which indicates a payout table to select upon calculating a speed of game play. Each of the entries 182, 184 and 186 includes (i) a speed identifier 188 for uniquely identifying the entry; (ii) a speed of play 190 range; and (iii) a selected payout table 192 for indicating which of a plurality of payout tables is to be the pay schedule for a game. In the example illustrated by FIG. 7, the selected payout table 192 may indicate one of three payout tables 200, 210 and 220, which are named "standard", "enhanced" and "superior", respectively, for reference purposes. For example, if the speed of game play is calculated to be six games per minute, then the entry 184 indicates that the enhanced payout table 210 is to be the pay schedule. Those skilled in the art will understand that the selection table 180 may include any number of payout tables and/or entries.

Figure 8A:
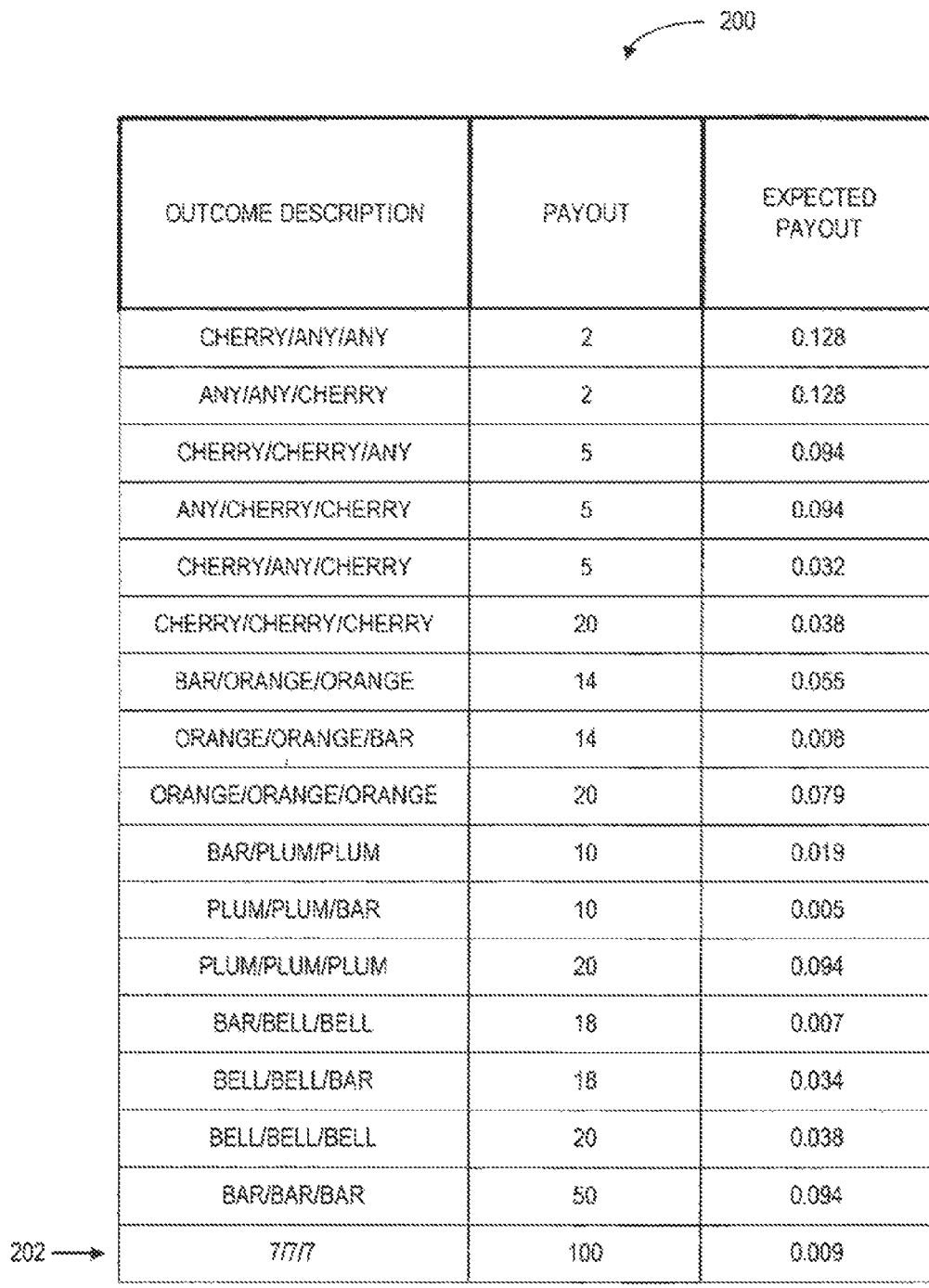

Referring to FIGS. 8A, 8B and 8C, the payout tables 200, 210 and 220 are illustrated in detail. Each of the payout tables 200, 210 and 220 indicates similar payouts for the various outcomes except the payout for the "seven/seven/seven" outcome. The entry 202 defines the payout for that outcome to be one hundred, the entry 212 defines the payout to be one hundred fifty and the entry 222 defines the payout to be two hundred. Accordingly, the payout table 220 defines a payout percentage which is higher than that of the payout table 210. Similarly, the payout table 210 defines a payout percentage which is higher than that of the payout table 200. However, as described above, the higher speed of play can compensate for the higher payout percentages (lower hold percentages). As indicated by Table 1, the revenue derived from the gaming device can actually be higher even when the hold percentage is lower.

TABLE 1

Revenue Calculations for Selection Table 180

|  | STANDARD | ENHANCED | SUPERIOR |
| --- | --- | --- | --- |
| Payout Percentage | 95.4% | 95.8% | 96.3% |
| Hold Percentage | 4.6% | 4.2% | 3.7% |
| Minimum Plays per Minute | 1 | 4 | 9 |
| Maximum Plays per Minute | 3 | 8 | — |
| Minimum Average Revenue per Minute | 0.046 | 0.167 | 0.333 |
| Maximum Average Revenue per Minute | 0.139 | 0.334 | — |

In Table 1, minimum and maximum average revenue per minute are calculated by multiplying the hold percentage with the minimum and maximum plays per minute, respectively. In addition, the listed values for revenue are in proportion to the amount wagered. For example, the maximum average revenue per minute of 0.046 indicates a revenue per minute of 4.6 cents for games in which a dollar (100 cents) is wagered.

As noted above, in the example illustrated by FIGS. 8A, 8B and 8C, each of the payout tables 200, 210 and 220 indicates similar payouts for the various outcomes except the payout for the "seven/seven/seven" outcome. However, those skilled in the art will understand that the plurality of payout tables may indicate similar or vastly dissimilar payouts, and likewise may indicate equal or unequal payout percentages. Typically, payout percentage will be higher for payout tables which are selected for higher speeds of game play, and the revenue per time period will typically be higher for higher speeds of game play. It can be especially advantageous to increase only the payout for unlikely outcomes, such as the outcome having the highest payout (e.g. a "jackpot" outcome). Even doubling the payout of an extremely unlikely event can attract players while also resulting in a payout percentage that is still acceptable to a casino.

FIG. 9 illustrates a selection table 250 for determining a pay schedule by multiplying the payout values of a predetermined payout table ("base payout table") by a multiplier that is based on the speed of game play. Those skilled in the art will understand that the selection table 250 may be implemented as a database stored in the storage device 14 (FIG. 1), may be implemented by process steps defined by the program 28 (FIG. 1), or a combination thereof. The selection table 250 includes entries 252, 254 and 256, each of which indicates a multiplier that is based on a speed of game play. Each of the entries 252, 254 and 256 includes (i) a speed identifier 258 for uniquely identifying the entry; (ii) a speed of play 260 range; and (iii) a multiplier 262 for indicating an amount by which to multiply the payout values of the base payout table. Since a payout (number of coins won per coin wagered) is typically an integer, a product of the multiplier and a payout may be rounded down to the highest integer value. For example, for a multiplier 1.04 and a payout 20, the product is 1.04×20=20.8, which rounds down to 20. In many cases, this rounding down will result in an unchanged payout.

The speed of play thus indicates a multiplier. For example, if the speed of game play is calculated to be nine games per minute, then the entry 256 indicates that the multiplier is 1.04. Those skilled in the art will understand that any number of multipliers and/or entries in the selection table 250 may be used.

Referring to FIGS. 10A, 10B and 10C, payout tables 280, 290 and 300 are illustrated in detail. The payout tables 280, 290 and 300 correspond to the multipliers of FIG. 9 applied to a base payout table, which is equal to the payout table 120 of FIG. 5. The payout table 280 corresponds to the speed of play indicated by the entry 252, and thus to a multiplier of 1.00. Thus, the payout table 280 indicates the same payouts as the base payout table. The payout tables 290 and 300 correspond to the speeds of play indicated by the entries 254 and 256, respectively, and thus to multipliers of 1.02 and 1.04, respectively. Accordingly, the payout table 300 defines a payout percentage which is higher than that of the payout table 290. Similarly, the payout table 290 defines a payout percentage which is higher than that of the payout table 280. However, as indicated by Table 2, the revenue derived from the gaming device can actually be higher even when the hold percentage is lower.

TABLE 2

Revenue Calculations for Selection Table 250

|  | TABLE 280 | TABLE 290 | TABLE 300 |
| --- | --- | --- | --- |
| Payout Percentage | 95.4% | 95.6% | 96.0% |
| Hold Percentage | 4.6% | 4.4% | 4.0% |
| Minimum Plays per Minute | 1 | 4 | 9 |
| Maximum Plays per Minute | 3 | 8 | — |

TABLE 2-continued

Revenue Calculations for Selection Table 250

| | TABLE 280 | TABLE 290 | TABLE 300 |
|---|---|---|---|
| Minimum Average Revenue per Minute | 0.046 | 0.177 | 0.362 |
| Maximum Average Revenue per Minute | 0.139 | 0.355 | — |

Although the present invention has been described with respect to a preferred embodiment thereof, those skilled in the art will note that various substitutions may be made to those embodiments described herein without departing from the spirit and scope of the present invention. For example, although a slot machine-type game has been described, the present invention is likewise applicable to other types of games, such as video poker, video blackjack and video roulette.

Racing Game Embodiments

Various embodiments are contemplated in which slot machines are configured to facilitate games with racing themes, such as races involving automobiles, horses, runners or other racing objects.

According to some racing embodiments, players are rewarded in accordance with their average speed of play. In some average speed racing embodiments, the average speed of play can be calculated in a manner similar to that which is disclosed with reference to step 156 of FIG. 6, such as by measuring the number of games played in a predetermined period of time. In such embodiments, payouts may be awarded as described with reference to the pay schedule table of FIG. 9.

In other average speed embodiments, a "virtual average speed" can be calculated based on an average of point values associated with different symbols on the slot machine's reels. Thus, a racing game may reward players based on their virtual average speed as determined by an average of the value of symbols occurring on the reels over a given amount of time or over a given number of outcomes (i.e. "spins").

For example, a NASCAR® themed slot machine game may require that players pre-purchase twenty five spins for twenty credits. The sale of twenty-five spins for twenty credits could be marketed to players as the sale and purchase of one "lap" around a racetrack. Upon commencement of the game by the commitment (i.e. deposit) of twenty credits, the player may initiate individual outcomes by, for example, pulling on the slot machine's handle. Individual outcomes may not by themselves directly lead to payouts, but may result in additions or subtractions to a running subtotal of point values. For example, an initial spin may yield the individual reel symbols of "+10 mph", "+15 mph" and "+5 mph", for a total of 30 mph (or points). A second spin may yield such symbols as "+20 mph", "+15 mph" and "+5 mph", for a per-spin total of 40 mph, and a running subtotal total of 70 mph (i.e. 30 mph from the first spin plus 40 mph from the second spin). Indeed, certain symbols or outcomes may result in a negative effect on a player's running count. For example, a rain symbol occurring on the payline of the slot machine may function to deduct 10 mph from the player's running count. Or, a flat tire symbol occurring on the payline may deduct 25 mph from the player's running count. Throughout the twenty five spin period, the racetrack and the player's progress around the racetrack could be as represented on a visual display, where a car associated with the player may advance ¹⁄₂₅ of the racetrack's length after every spin.

At the end of the 25 spin period, the player may be awarded a payout based on his or her (1) finishing speed (i.e. the final sum of reel symbol values that occurred during the 25 spin period), and/or (2) virtual average speed (i.e. the average of the reel symbols values that occurred during the 25 spin period.

Systems and methods for rewarding players of racing-themed games based on the aggregate value of symbols occurring over a plurality of gaming events is described in co-pending Utility patent application Ser. No. 10/772,837, entitled "ELECTRONIC AMUSEMENT DEVICE AND METHOD FOR ENHANCED SLOT MACHINE PLAY", filed Feb. 5, 2004; and in co-pending Utility patent application Ser. No. 10/778,576, entitled "METHOD AND APPARATUS FOR ENHANCED PLAY OF A GAMING DEVICE", filed Feb. 13, 2004. These applications are incorporated by reference herein for all purposes.

The invention is claimed as follows:

1. A gaming system comprising:
   at least one input device,
   at least one display device,
   at least one processor, and
   at least one data storage device which stores a plurality of instructions, which when executed by the at least one processor, cause the at least one processor to operate with the at least one input device and the at least one display device to:
   (a) determine a multiplier from a plurality of different multipliers, said determination being based in part on a quantity of plays of a wagering game by a player during a period of time prior to a triggering event, wherein the multiplier is greater if the quantity of plays of the wagering game by the player during the period of time is greater,
   (b) determine an award to provide to the player after the triggering event, wherein the award is based on the determined multiplier, and
   (c) display the determined award.

2. The gaming system of claim 1, wherein the period of time is a predefined amount of time.

3. A gaming system comprising:
   at least one input device,
   at least one display device,
   at least one processor, and
   at least one data storage device which stores a plurality of instructions, which when executed by the at least one processor, cause the at least one processor to operate with the at least one input device and the at least one display device to:
   (a) determine a multiplier from a plurality of different multipliers, said determination being based in part on a quantity of plays of a wagering game by a player during a period of time prior to a triggering event, wherein:
      (i) the multiplier is a first multiplier if the quantity of plays of the wagering game by the player during the period of time is a first quantity,
      (ii) the multiplier is a second multiplier if the quantity of plays of the wagering game by the player during the period of time is a second quantity,
      (iii) the second multiplier is greater than the first multiplier, and
      (iv) the second quantity is greater than the first quantity,
   (b) determine an award to provide to the player after the triggering event, wherein the award is based on the determined multiplier, and (c) display the determined award.

4. The gaming system of claim 3, wherein the period of time is a predefined amount of time.

5. A gaming system comprising:
at least one input device,
at least one display device,
at least one processor, and
at least one data storage device which stores a plurality of instructions, which when executed by the at least one processor, cause the at least one processor to operate with the at least one input device and the at least one display device to:
   (a) determine a multiplier, said determination being based, at least in part, on a speed of game play during a period of time prior to a triggering event, wherein if a first wager amount is placed per game play during the period of time:
      (i) a first multiplier is determined for a first speed of game play during the period of time, and
      (ii) a second, different multiplier is determined for a second, different speed of game play during the period of time,
   (b) determine an award to provide to the player after the triggering event, wherein the award is based, at least in part, on the determined multiplier, and
   (c) display the determined award.

6. The gaming system of claim 5, wherein the speed of game play during the period of time is based on at least one selected from the group consisting of: a quantity of games played during the period of time, an amount of time elapsed between at least two games played during the period of time, and an amount of time elapsed between at least two events which occur in association with at least one of the games played during the period of time.

7. The gaming system of claim 5, wherein the first speed of play is greater than the second speed of play and the first multiplier is greater than the second multiplier.

8. The gaming system of claim 5, wherein the period of time is a predefined amount of time.

9. A gaming system comprising:
at least one input device,
at least one display device,
at least one processor, and
at least one data storage device which stores a plurality of instructions, which when executed by the at least one processor, cause the at least one processor to operate with the at least one input device and the at least one display device to:
   (a) determine a multiplier, said determination being based, at least in part, on a speed of game play during a period of time prior to a triggering event, wherein for equal wager amounts placed per game during the period of time:
      (i) a first multiplier is determined for a first speed of game play during the period of time, and
      (ii) a second, different multiplier is determined for a second, different speed of game play during the period of time,
   (b) determine an award to provide to the player after the triggering event, wherein the award is based, at least in part, on the determined multiplier, and
   (c) display the determined award.

10. The gaming system of claim 9, wherein the speed of game play during the period of time is based on at least one selected from the group consisting of: a quantity of games played during the period of time, an amount of time elapsed between at least two games played during the period of time, and an amount of time elapsed between at least two events which occur in association with at least one of the games played during the period of time.

11. The gaming system of claim 9, wherein the first speed of play is greater than the second speed of play and the first multiplier is greater than the second multiplier.

12. The gaming system of claim 9, wherein the period of time is a predefined amount of time.

* * * * *

UNITED STATES PATENT AND TRADEMARK OFFICE
CERTIFICATE OF CORRECTION

| | | |
|---|---|---|
| PATENT NO. | : 8,721,437 B2 | Page 1 of 1 |
| APPLICATION NO. | : 14/085364 | |
| DATED | : May 13, 2014 | |
| INVENTOR(S) | : Jay S. Walker et al. | |

It is certified that error appears in the above-identified patent and that said Letters Patent is hereby corrected as shown below:

IN THE CLAIMS

In Claim 5, Column 11, Line 23, replace the first instance of "the" with --a--.
In Claim 7, Column 11, Line 36, before the first instance of "play" insert --game--.
In Claim 7, Column 11, Line 36, between "of" and the second instance of "play" insert --game--.
In Claim 9, Column 12, Line 21, replace the first instance of "the" with --a--.
In Claim 11, Column 12, Line 34, between the first instance of "of" and the first instance of "play" insert --game--.
In Claim 11, Column 12, Line 34, between the second instance of "of" and the second instance of "play" insert --game--.

Signed and Sealed this
Fourteenth Day of October, 2014

Michelle K. Lee
*Deputy Director of the United States Patent and Trademark Office*